United States Patent
Kojo et al.

(10) Patent No.: US 6,896,091 B2
(45) Date of Patent: May 24, 2005

(54) VEHICULAR STEERING CONTROL APPARATUS AND METHOD

(75) Inventors: Takahiro Kojo, Susono (JP); Junji Kawamuro, Susono (JP); Masatoshi Nakatsu, Susono (JP); Masato Suzumura, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/611,925

(22) Filed: Jul. 3, 2003

(65) Prior Publication Data

US 2004/0007413 A1 Jan. 15, 2004

(30) Foreign Application Priority Data

Jul. 9, 2002 (JP) .................................. 2002-200325

(51) Int. Cl.$^7$ ................................. B62D 5/04
(52) U.S. Cl. ................ 180/402; 180/422; 180/446; 701/41
(58) Field of Search ........................... 180/402, 403, 180/421, 422, 423, 443, 446; 701/41, 42

(56) References Cited

U.S. PATENT DOCUMENTS

| 6,360,151 B1 * | 3/2002 | Suzuki et al. .................. 701/41 |
| 6,408,236 B2 * | 6/2002 | Nishiwaki et al. ............ 701/41 |
| 6,598,699 B2 * | 7/2003 | Takehara et al. ............ 180/446 |

FOREIGN PATENT DOCUMENTS

| JP | A 1-095968 | 4/1989 |
| JP | A 2001-138936 | 5/2001 |

* cited by examiner

Primary Examiner—Kevin Hurley
(74) Attorney, Agent, or Firm—Oliff & Berridge, PLC

(57) ABSTRACT

A vehicular steering control apparatus controls the wheel steering amount of wheels based on a steering angle and an assist angle obtained by multiplying a steering speed by a gain. If the amount of power control differs between the left wheel and the right wheel, the value of gain is increased. The amount of power control includes, for example, the amount of braking control and the amount of drive control. If the assist angle is increased by increasing the gain, the magnitude of the wheel steering amount relative to the steering angle increases, so that a driver can correct the orientation of the vehicle body by performing a small amount of steering operation.

7 Claims, 4 Drawing Sheets

VEHICULAR STEERING CONTROL APPARATUS AND METHOD

INCORPORATION BY REFERENCE

The disclosure of Japanese Patent Application No. 2002-200325 filed on Jul. 9, 2002, including the specification, drawings and abstract, is incorporated herein by reference in its entirety.

BACKGROUND OF THE INVENTION

1. Field of the Invention

The invention relates to vehicular steering control apparatus and method for controlling the tire wheel steering amount in accordance with the steering wheel speed.

2. Description of the Related Art

A differential steering control for controlling the tire wheel steering amount in accordance with the steering wheel speed is disclosed in, for example, Japanese Patent Application Laid-open No. 2001-138936. In the differential steering control, an actual wheel steering amount β is controlled as described in an equation below if a driver turns the steering wheel by a steering angle of α at a steering speed of Vα. In the equation, k is a constant, and ks(v) is a function of the vehicle speed V, and is a gain in steering wheel speed.

$$\beta = \alpha \cdot k + V\alpha \cdot ks(v)$$

Through this control, the tire wheel steering amount β is increased if a driver quickly turns the steering wheel, for example, to avoid a danger. Therefore, danger avoidance can be achieved merely by a small turn of the steering wheel. Conversely, if a driver slowly turns the steering wheel, the assist angle that is added to the multiplication product of the steering wheel angle α and the constant k is small. Thus, necessary fine steering operation becomes possible.

When right and left wheels face different road surface conditions, the wheels may experience different friction coefficients μ (hereinafter, this situation may be referred to as "different-μ state"), so that the braking amount will differ between the right and left wheels. For example, if the friction coefficient μ of the right side road surface is greater than the friction coefficient μ of the left side road surface (i.e., the right side road surface provides greater resistance), braking may result in a grip of the right side wheel, so that the vehicle body may turn clockwise in a plan view. In such an event, the driver will likely try to correct the orientation of the vehicle body to a normal orientation by quickly turning the steering wheel to the left (i.e., in the direction opposite to the turning direction of the vehicle). Normally, the vehicle body can be turned more easily if the delay in the response of the vehicle body orientation to steering operation is a little. However, it is a general practice to avoid high-response steering setting for ordinary vehicle running because stability is considered more important for ordinary running.

During the different-μ state, an event similar to the above-described event related to braking can occur when tire wheels are driven. That is, if the friction coefficient μ of the right side road surface is greater than the friction coefficient μ of the left side road surface, the right side wheel grips during an initial period of the driving, so that the vehicle body turns counterclockwise. In this case, the driver tends to quickly turn the steering wheel to the right in order to normalize the orientation of the vehicle body.

SUMMARY OF THE INVENTION

The invention has been accomplished in order to solve the aforementioned problems. It is an object of the invention to provide vehicular steering control apparatus and method for allowing a driver to easily change the orientation of a vehicle body, for example in a situation where the road surface condition differs between right and left side wheels.

In order to achieve the aforementioned object, in vehicular steering control apparatus and method in accordance with the invention, the wheel steering amount is controlled based on a steering angle, and an assist angle obtained by multiplying a steering speed by a gain. A value of the gain is increased if there is a difference in an amount of power control between a right wheel and a left wheel of a vehicle.

If braking is performed in a situation, for example, where the right and left wheels are in different road surface conditions, the amount of braking control differs between the right and left wheels of the vehicle. The amount of braking control herein refers to an amount of control applied to the left wheel and the right wheel at the time of braking. In the aforementioned case, the gain is increased so as to increase the assist angle according to the invention. That is, the magnitude of the wheel steering amount relative to the steering angle is increased in comparison with a case where there is no difference in the amount of braking control between the left and right wheels. Therefore, the delay in the response of the orientation of the vehicle body to the steering operation is reduced, and the orientation of the vehicle body can be more easily corrected. Thus, the correction steering can be reduced. Similarly, if during the driving of the vehicle, there occurs a difference in the amount of drive control (i.e., the amount of control applied to the wheels at the time of driving) between the left and right wheels, the gain is increased, so that a driver can easily correct the orientation of the vehicle body.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
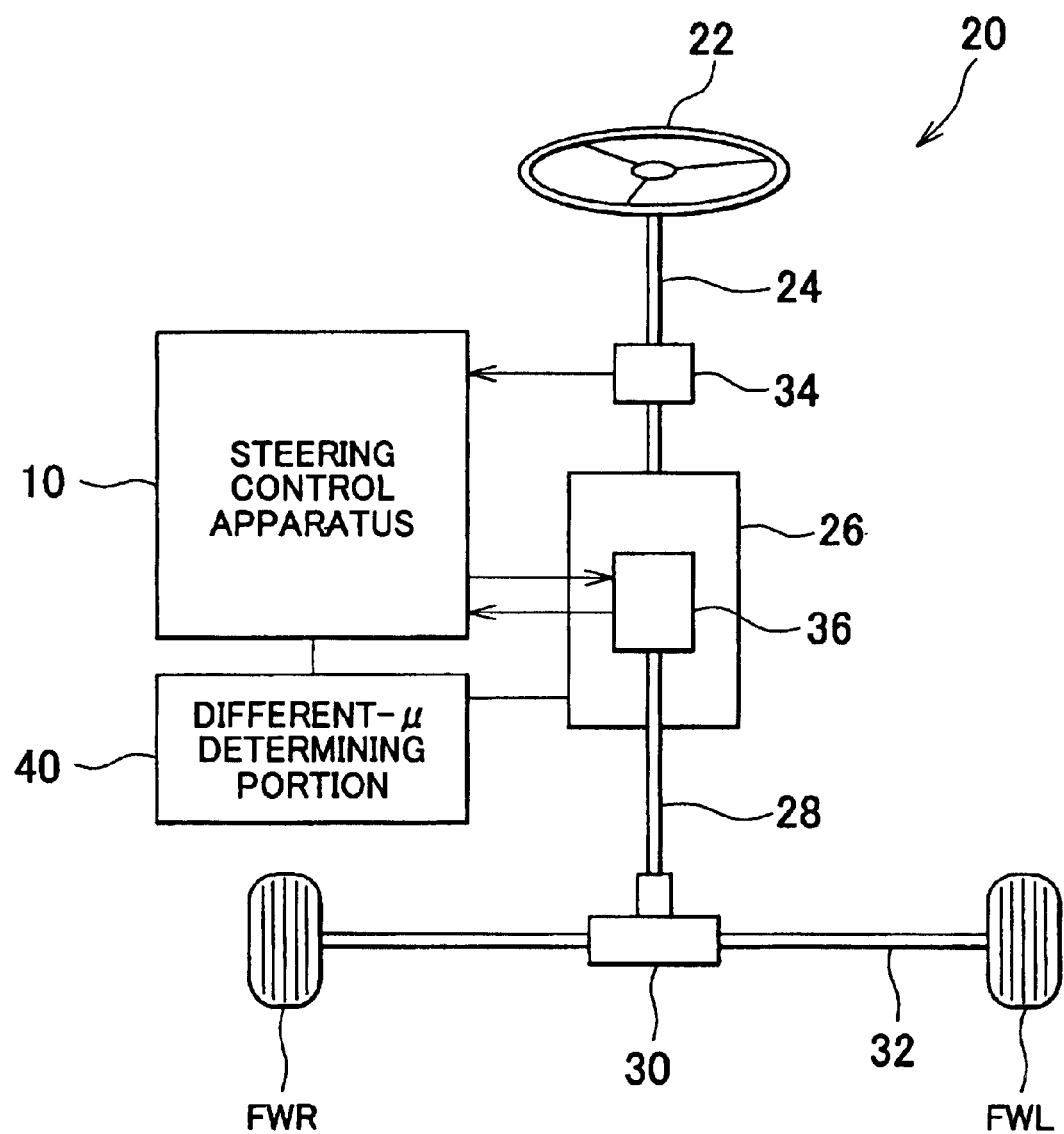
FIG. 1 is a schematic diagram illustrating a construction of a vehicle equipped with a vehicular steering control apparatus in accordance with an embodiment of the invention.

Preferred embodiments of the vehicular steering control apparatus of the invention will be described in detail hereinafter with reference to the accompanying drawings. The same or comparable components are represented by the same reference characters, and will not be redundantly described below.

FIG. 1 is a schematic diagram illustrating a construction of a vehicle 20 equipped with a vehicular steering control apparatus 10 in accordance with an embodiment of the invention. The vehicle 20 includes a steering wheel 22 that a driver operates to steer front right and left wheels FWR, FWL, an input shaft 24 to which the turning angle of the steering wheel 22 is input, a variable transfer ratio portion 26 connected to the input shaft 24, an output shaft 28 connected to the variable transfer ratio portion 26, and a rack shaft 32 that is connected to the output shaft 28 via a rack-and-pinion gear unit 30 and that is connected at opposite ends thereof to the steered front right and left wheels FWR, FWL. The vehicle 20 is equipped with the steering control apparatus 10 and a different-$\mu$ state determining portion 40. Details of the steering control apparatus 10 and the different-$\mu$ determining portion 40 will be described later.

The input shaft 24 is provided with a steering angle sensor 34 for detecting the steering angle of the steering wheel 22. The information regarding the steering angle detected by the steering angle sensor 34 is transmitted to the steering control apparatus 10.

As for the variable transfer ratio portion 26, the input shaft 24 and the output shaft 28 are connected via a predetermined gear mechanism, and the gear mechanism is driven via an actuator 36 that is formed by, for example, a servo motor or the like, so as to change the transfer ratio between the input shaft 24 and the output shaft 28. The transfer ratio is determined by the steering control apparatus 10. The actuator 36 is provided with an operation angle sensor for detecting the operation angle of the actuator 36 (the operation angle with respect to the input shaft 24). The operation angle detected by the sensor is transmitted to the steering control apparatus 10.

The steering control apparatus 10 will next be described. The steering control apparatus 10 is designed to execute a differential steering control. On the basis of the information regarding the steering angle $\alpha$ acquired from the steering angle sensor 34 and the information regarding the steering speed V$\alpha$ acquired factoring in the time interval of detection of the steering angle $\alpha$, the steering control apparatus 10 computes the wheel steering amount $\beta$ of the wheels FWR, FWL as in the following equation (1). In the equation (1), k is a constant, and ks(v) is a function of the vehicle speed V, and is a gain in the steering speed V$\alpha$.

$$\beta = \alpha \cdot k + V\alpha \cdot ks(v) \quad (1)$$

In the equation (1), the second term on the right side is an assist angle obtained by multiplying the steering speed V$\alpha$ by the gain ks(v). That is, in this embodiment, the wheel steering amount $\beta$ of the wheels FWR, FWL is computed by adding the assist angle to the multiplication product of the steering angle $\alpha$ and the constant k.

Furthermore, the steering control apparatus 10 is designed to increase the value of the gain "ks(v)" in the equation (1) if there is a difference in the amount of power control between the right wheel FWR and the left wheel FWL. The power control herein includes both a braking control performed on the steered tire wheels FWR, FWL in order to brake the vehicle, and a drive control performed on the wheels FWR, FWL in order to drive the vehicle. The steering control apparatus 10 acquires information indicating that the amount of power control differs between the right wheel FWR and the left wheel FWL, from the different-$\mu$ determining portion 40. The effect of increasing the value of the gain "ks(V)" will be described later.

Specifically, the different-$\mu$ determining portion 40 may be realized by a known ABS device (anti-lock brake system) or a VSC device (vehicle stability control). For example, in a case where a yaw control is being executed so as to prevent a spin of the vehicle body from being caused by a wheel speed difference between the right and left wheels, or where there is a difference in the braking amount (ex; oil pressure for braking) between the right and left wheels, the different-$\mu$ determining portion 40 determines that the vehicle is in a different-$\mu$ state, that is, a state where the friction coefficient $\mu$ differs between the right and left wheels FWR, FWL, for example, for a reason that the right and left wheels FWR, FWL face different road surface conditions. That is, it is determined that the vehicle is in the different-$\mu$ state if the amount of drive control for rotating the wheels, or the amount of braking control for stopping rotation of the wheels differs between the right wheel FWR and the left wheel FWL. If it is determined that the vehicle is in the different-$\mu$ state, the different-$\mu$ determining portion 40 transmits information indicating the different-$\mu$ state, to the steering control apparatus 10.

Figure 2:
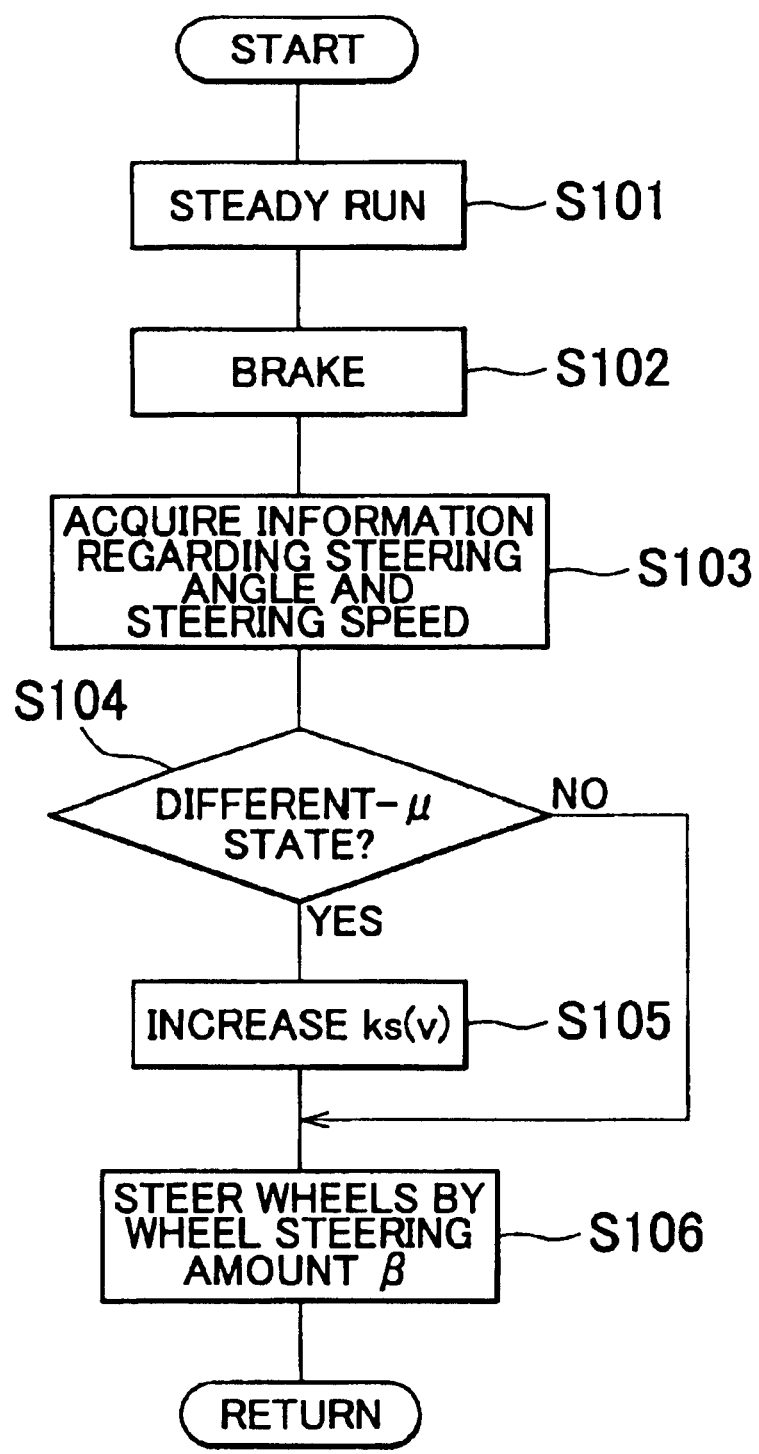
FIG. 2 is a flowchart illustrating an operation of the vehicular steering control apparatus.

Above described is a general construction of the embodiment. Next, operation of the steering control apparatus 10 will be described with reference to the flowchart of FIG. 2.

During steady run of the vehicle 20 (S101), the steering control apparatus 10 is in an activated state. For example, if an obstacle appears ahead in the running direction of the vehicle, the driver depresses the brake pedal in order to avoid the obstacle (S102), thereby causing the braking control of the vehicle 20.

After that, the steering control apparatus 10 acquires information regarding the steering angle $\alpha$ from the steering angle sensor 34, and obtains information regarding the steering speed V$\alpha$ factoring in the time interval of detection of the steering angle $\alpha$. The information regarding the steering angle $\alpha$ may also be transmitted to the steering control apparatus 10 periodically instead of only when the brake pedal is depressed. Furthermore, the steering control apparatus 10 may acquire information regarding the steering speed from a steering speed sensor that is separately provided, instead of calculating the steering speed V$\alpha$ from the steering angle $\alpha$.

Figure 3:
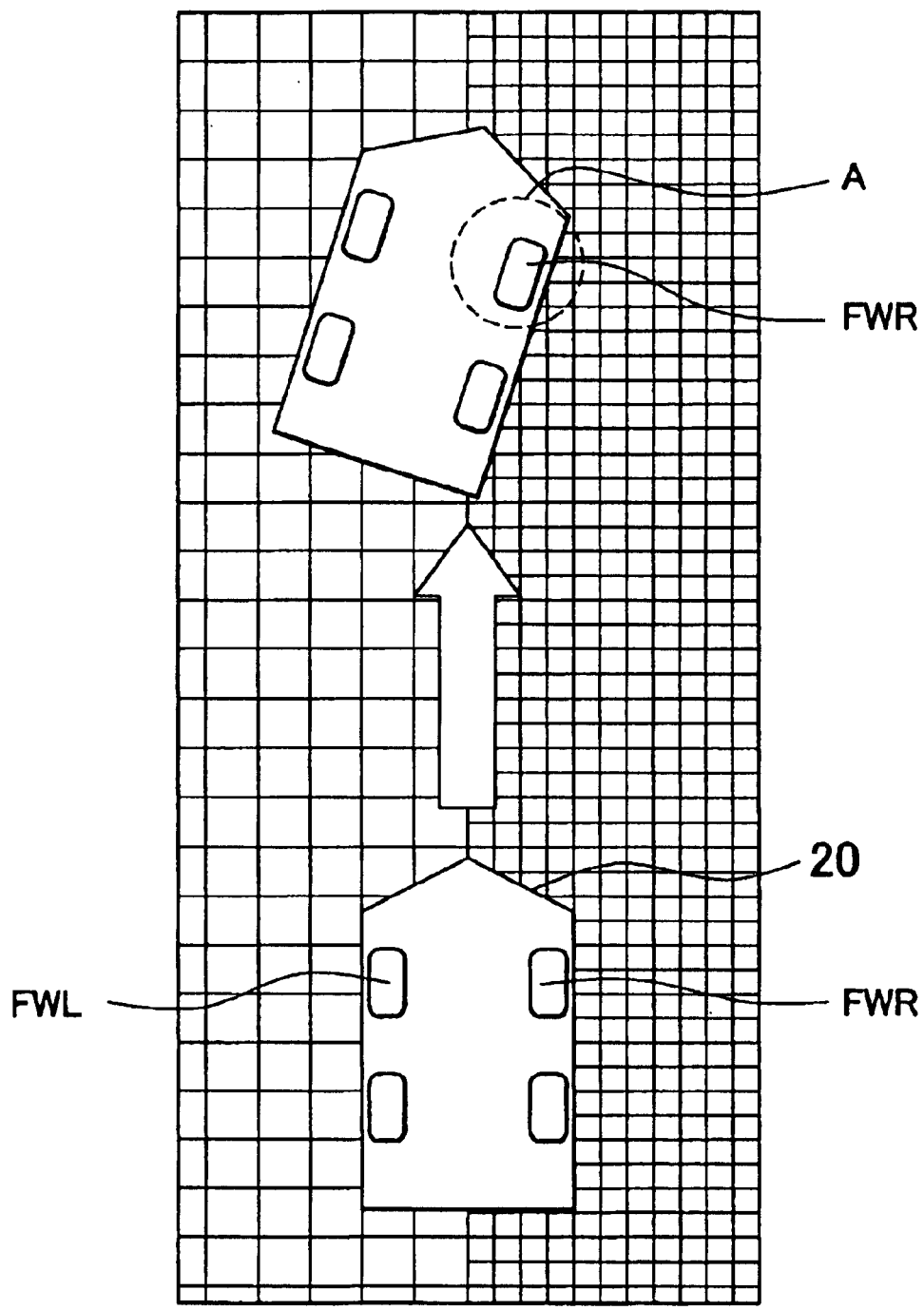
FIG. 3 is a diagram indicating a situation where a vehicle is braked during a different-μ state.

Subsequently in S104, the steering control apparatus 10 determines whether the vehicle 20 is in the different-$\mu$ state on the basis of the information from the different-$\mu$ determining portion 40. If the vehicle 20 is in the different-$\mu$ state during braking, a phenomenon described below may occur. That is, if the friction coefficient $\mu$ of the right side road surface in contact with the right wheel FWR is greater than the friction coefficient $\mu$ of the left side road surface in contact with the left wheel FWL as indicated in FIG. 3, the right side wheel may grip at the time of braking (see a region A indicated by a broken-line circle), so that the vehicle body will turn clockwise in a plan view. In such an event, the driver is likely to quickly turn the steering wheel 22 leftward (i.e., in a direction opposite to the turning direction of the vehicle) in order to normalize the orientation of the vehicle body.

Figure 4:
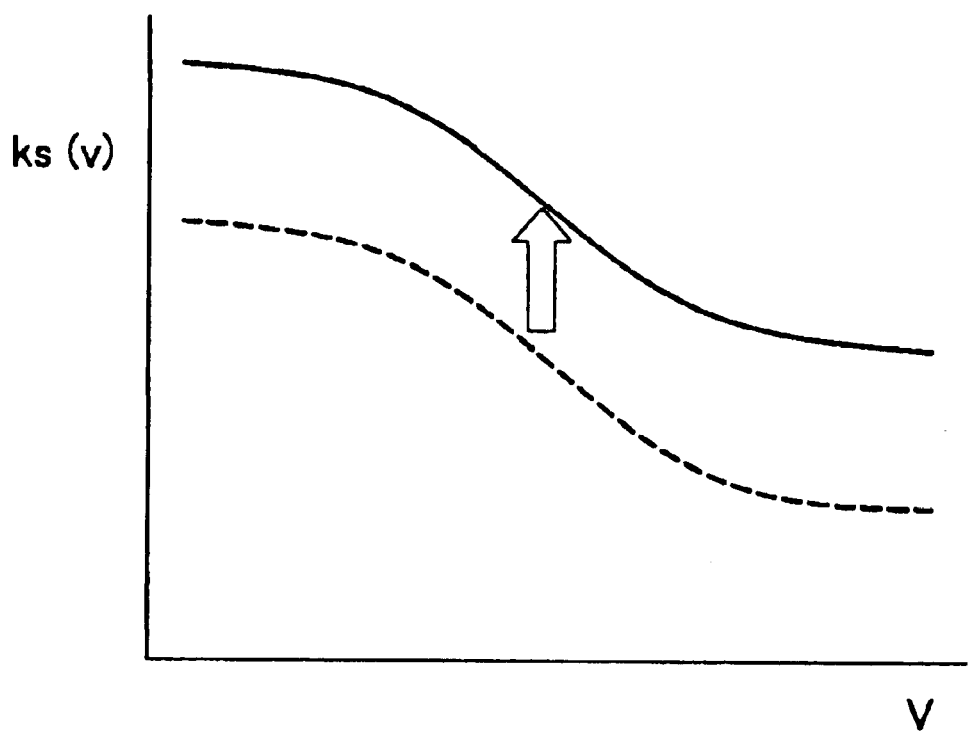
FIG. 4 is a graph indicating the gain "ks(v)" before an increase and the gain "ks(v)" after an increase.

If it is determined in S104 that the vehicle 20 is in the different-$\mu$ state, the process proceeds to S105, in which the steering control apparatus 10 increases the assist angle by increasing the gain "ks(v)" in the equation (1) as indicated in FIG. 4. FIG. 4 is a graph indicating the gain "ks(v)" (as shown by an actual line) as a function of the vehicle speed before an increase, and the gain "ks(v)" (as shown by a broken line) as a function of the vehicle speed after an increase. The pattern of increasing the gain "ks(v)" indicated in FIG. 4 is a mere example. Other techniques for increasing the gain "ks(v)" include a technique in which the gain "ks(v)" is increased by a fixed amount regardless of the vehicle speed, a technique in which the amount of increase is variable on the basis of the vehicle speed or the variable gear ratio, etc. Any suitable one of such techniques may be selected in accordance with the characteristics of the vehicle.

Subsequently in S106, the steering control apparatus 10 computes a wheel steering amount $\beta$ based on the increased gain "ks(v)", and steers the wheels FWR, FWL by the wheel steering amount β via the actuator 36.

According to the steering control apparatus 10 of the embodiment, if the vehicle is in the different-μ state, the value of the gain is increased so as to increase the magnitude of the wheel steering amount β of the wheels FWR, FWL relative to the steering angle α actually provided by the driver's operation. Therefore, in such a state, the driver can correct the orientation of the vehicle 20 by performing a small amount of steering operation.

Although the foregoing description is made in conjunction with the braking of the vehicle 20, substantially the same advantages can also be achieved during the driving of the vehicle. For example, if the friction coefficient μ of the right side road surface is greater than the friction coefficient μ of the left side road surface as indicated in FIG. 3, the right wheel FWR grips during an initial period of the driving of the vehicle, so that the vehicle 20 turns counterclockwise in a plan view. In this case, the driver tends to quickly turn the steering wheel rightward in order to normalize the orientation of the vehicle. In this embodiment, the value of the aforementioned gain is increased if there is a difference in the drive control between the right and left wheels FWR, FWL. Therefore, in the aforementioned case, the embodiment allows the driver to correct the orientation of the vehicle body by performing a small amount of steering operation.

While the invention has been specifically described with reference to embodiments, the invention is not limited to the above-disclosed embodiments. For example, although in the foregoing embodiments, the gear ratio is fixed during the control as indicated by the constant k in the first term on the right side of the equation (1) for determining the wheel steering amount β, the gear ratio may be variable, that is, the aforementioned first term may be replaced by a function of the vehicle speed V "α·k(v)".

Still further, in the vehicular steering control apparatus of the invention, the value of the aforementioned gain may be increased not only in the case where the vehicle is in the different-μ state, but also in the case where the amount of drive control differs between the right wheel and the left wheel of the vehicle, for example, for a reason that the friction coefficient differs between the right and left wheels.

As described above, according to the vehicular steering control apparatus of the invention, if the road surface condition differs between the right and left wheels, the value of the gain used to compute the assist angle is increased, so that the driver can easily correct the orientation of the vehicle body.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A vehicular steering control apparatus comprising:

a controller that controls an wheel steering amount of a wheel based on a steering angle, and an assist angle obtained by multiplying a steering speed by a gain, wherein the controller increases a value of the gain if there is a difference in an amount of power control between a right wheel and a left wheel of a vehicle.

2. The apparatus according to claim 1, wherein the amount of power control includes an amount of control applied to the left wheel and the right wheel in order to brake the vehicle.

3. The apparatus according to claim 1, wherein the amount of power control includes an amount of control applied to the left wheel and the right wheel in order to drive the vehicle.

4. The apparatus according to claim 1, further comprising an actuator for steering the left wheel and the right wheel of the vehicle, wherein the controller causes the actuator to steer the left wheel and the right wheel by the wheel steering amount.

5. The apparatus according to claim 1, wherein the controller calculates the wheel steering amount by adding the assist angle to the steering angle.

6. The apparatus according to claim 1, wherein the gain changes in accordance with a vehicle speed.

7. The apparatus according to claim 1, wherein a difference in the amount of power control between the left wheel and the right wheel of the vehicle occurs if a friction coefficient regarding the left wheel and a friction coefficient regarding the right wheel are different from each other.

* * * * *